(12) United States Patent
Mann

(10) Patent No.: US 9,038,184 B1
(45) Date of Patent: May 19, 2015

(54) DETECTION OF MALICIOUS SCRIPT OPERATIONS USING STATISTICAL ANALYSIS

(75) Inventor: Uriel Mann, Oak Park, CA (US)

(73) Assignee: Symantec Corporation, Mountain View, CA (US)

( * ) Notice: Subject to any disclaimer, the term of this patent is extended or adjusted under 35 U.S.C. 154(b) by 768 days.

(21) Appl. No.: 12/706,997

(22) Filed: Feb. 17, 2010

(51) Int. Cl.
*G06F 21/00* (2013.01)
*G06F 21/56* (2013.01)

(52) U.S. Cl.
CPC ............ *G06F 21/562* (2013.01); *G06F 21/563* (2013.01); *G06F 21/566* (2013.01)

(58) Field of Classification Search
CPC . H04L 63/14; H04L 63/1408; H04L 63/1416; H04L 63/1433; G06F 21/50; G06F 21/52; G06F 21/55; G06F 21/56; G06F 21/561; G06F 21/562; G06F 21/563; G06F 21/564; G06F 21/566
USPC ...................................................... 726/22–25
See application file for complete search history.

(56) References Cited

U.S. PATENT DOCUMENTS

| | | | |
|---|---|---|---|
| 6,272,641 B1 * | 8/2001 | Ji ..................................... | 726/24 |
| 6,708,185 B2 | 3/2004 | Harris | |
| 7,177,937 B2 * | 2/2007 | Bates et al. .................... | 709/228 |
| 7,779,472 B1 * | 8/2010 | Lou ................................. | 726/24 |
| 7,873,717 B1 * | 1/2011 | Woolway ...................... | 709/223 |
| 8,635,694 B2 * | 1/2014 | Malyshev et al. ............... | 726/23 |
| 2004/0181677 A1 * | 9/2004 | Hong et al. .................... | 713/188 |
| 2006/0075494 A1 * | 4/2006 | Bertman et al. ................ | 726/22 |
| 2008/0133540 A1 * | 6/2008 | Hubbard et al. ............... | 707/10 |
| 2009/0150999 A1 * | 6/2009 | Dewey et al. .................... | 726/24 |
| 2010/0024033 A1 * | 1/2010 | Kang et al. ...................... | 726/23 |
| 2010/0115620 A1 * | 5/2010 | Alme ............................... | 726/24 |
| 2010/0192222 A1 * | 7/2010 | Stokes et al. .................... | 726/22 |
| 2011/0035486 A1 * | 2/2011 | Seolas et al. ................... | 709/224 |
| 2011/0041179 A1 * | 2/2011 | St Hlberg ........................ | 726/23 |
| 2011/0083183 A1 * | 4/2011 | Freeman ......................... | 726/24 |
| 2011/0162070 A1 * | 6/2011 | Krasser et al. .................. | 726/23 |

OTHER PUBLICATIONS

Li et al., "A Web Page Malicious Code Detect Approach Based on Script Execution", Aug. 2009, pp. 1-5 http://ieeexplore.ieee.org/xpls/abs_all.jsp?arnumber=5362882&tag=1.*

(Continued)

*Primary Examiner* — Kaveh Abrishamkar
*Assistant Examiner* — Carlos M De Jesus Lassaia
(74) *Attorney, Agent, or Firm* — Fenwick & West LLP

(57) ABSTRACT

A security server renders a plurality of web pages. The security server logs script operations of the plurality of web pages that are performed when the web pages are rendered. Sequences of script data values that result from the script operations are determined. The sequences of script data values are tagged as either malicious or non-malicious based on whether the script operations associated with the sequence of script data values resulted in abnormal behavior in the computer. A statistical analysis is performed on the malicious and non-malicious script data values to determine likelihoods that identified sequences of script data values represent malicious behavior. The security server generates security data based on the statistical analysis. The security data are provided to clients. The clients monitor script operations of web pages accessed by the clients, and use the security data to identify malicious script operations.

16 Claims, 6 Drawing Sheets

(56) References Cited

OTHER PUBLICATIONS

Moshchuk et al., "SpyProxy: Execution-based Detection of Malicious Web Content", 2007, pp. 27-42 https://www.usenix.org/legacy/event/sec07/tech/full_papers/moshchuk/moshchuk.pdf https://www.usenix.org/legacy/event/sec07/tech/moshchuk.html.*

Li et al., "A Web Page Malicious Code Detect Approach Based on Script Execution", Aug. 2009, pp. 1-5 http://ieeexplore, ieee.org/xpls/abs_all.jsp?arnu mber=5362882&tag= 1.*

Li et al., "A Web Page Malicious Code Detect Approach Based on Script Execution", Aug. 2009, pp. 1-5 http://ieeexplore, ieee.org/xpls/abs_all.jsp?arnumber=5362882&tag=1.*

Moshchuk et al., "SpyProxy: Execution-based Detection of Malicious Web Content", 2007, pp. 27-42 https://www.usenix.org/legacy/eventJsecO7/tech/full_papers/moshchuk/moshchuk.pdf https://www.usenix.org/legacy/eventJsecO7/tech/moshchuk.html.*

Kirda et al., "Behavior-based spyware detection", 2006, pp. 1-16, http://citeseerx.ist.psu.edu/viewdoc/summary?doi=10.1.1.70.1129.*

Liang et al., "Malicious Web Pages Detection Based on Abnormal Visibility Recognition", 2009, pp. 1-5, http://ieeexplore.ieee.org/stamp/stamp.jsp?arnumber=5138008.*

Mehdi et al., "IMAD: In-Execution Malware Analysis and Detection", Jul. 2009, pp. 1553-1560, URL listed in V http://delivery.acm.org/10.1145/1580000/1570109/p1553-mehdi.pdf?ip=151.207.250.51&id=1570109&acc=ACTIVE%20SERVICE&key=C15944E53D0ACA63%2E4D4702B0C3E38B35%2E4D4702B0C3E38B35%2E4D4702B0C3E38B35&CFID=640742594&CFTOKEN=30204551&__acm__=1426277099_d9172b5550a6b2325bde6ee4d29ff608.*

Archive of "Execution Analysis Including Statistical Analysis," www.laquso.com, LaQuSo, 2007-2008, 1 page, [Online] [Archived by http://www.archive.org on May 7, 2008; Retrieved on Aug. 16, 2010] Retrieved from the Internet<URL:www.laquso.com/services/test_execution_analysis.php>.

\* cited by examiner

DETECTION OF MALICIOUS SCRIPT OPERATIONS USING STATISTICAL ANALYSIS

BACKGROUND OF THE INVENTION

1. Field of the Invention

This invention pertains in general to computer security and in particular to the development of security data that protects against execution of malicious script operations by websites.

2. Description of the Related Art

There is a wide variety of malicious software (malware) that can attack modern computers. One type of malware threat includes malicious websites that exploit security vulnerabilities in browsers that load web pages from the websites. When a web page from a malicious website is loaded, a malicious script (e.g., JavaScript or VBScript) in the page manipulates a scriptable object on the page, such as a text box, form field, or table in a manner that is inconsistent with the object's intended operation. For example, the script can provide a form field object with a value that exceeds an expected range, such as a number or string that is too large. Similarly, the script can perform an inconsistent sequence of operations, such as attempting to delete rows of an empty table. Additionally, the malicious script may manipulate a browser add-on or extension object (e.g., an ActiveX control, plug-in, or extension) in a manner that is inconsistent with the object's intended operation.

Some of these manipulations allow a security vulnerability in the browser or browser add-on and extension object to be exploited. Thus, malicious actors can create web pages having malicious scripts that perform the manipulations in order to compromise computers of website visitors. Once the computers are compromised, the malicious actors can perform additional malicious actions, such as stealing data and executing malicious code on the compromised computers.

Accordingly, there is a need in the art for ways to detect scripts attempting to perform malicious actions.

BRIEF SUMMARY

The above and other needs are met by a computer-implemented method and a computer system for generating sequences of operations performed by malicious scripts and a non-transitory computer-readable storage medium storing executable code for providing security to a client. One embodiment of the computer-implemented method comprises rendering a plurality of web pages received from a plurality of websites where at least some of the plurality of web pages have associated scripts. The computer-implemented method determines whether sequences of script operations performed by the scripts produce abnormal behaviors responsive to the rendering of the plurality of web pages. The computer-implemented method tags the sequences of script operations performed by the scripts as malicious responsive to whether the sequences of script operations produce abnormal behaviors. Security data is generated based at least in part on the tagged sequences of script operations performed by the scripts where the security data describes sequences of malicious script operations. The computer-implemented method stores the security data.

Embodiments of a non-transitory computer-readable storage medium storing executable code for providing security to a client. The code comprises a security database adapted to store security data indicating likelihoods that sequences of script operations are malicious. A monitoring module is adapted to monitor script operations performed responsive to a web page being rendered by the client to produce a monitored sequence of script operations. The monitoring module is also adapted to use the security data to determine a likelihood that the monitored sequence of script operations is malicious. A security action module is adapted to perform a security action on the client responsive to the determined likelihood that the monitored sequence of script operations is malicious.

Embodiments of a computer system for generating security data describing sequences of operations performed by malicious scripts comprises a computer processor and a non-transitory computer-readable storage medium storing computer code, the code when executed by the processor performs steps comprising rendering a plurality of web pages received from a plurality of websites where at least some of the plurality of web pages have associated scripts. Sequences of script operations performed by the scripts that produce abnormal behaviors are determined responsive to the rendering of the plurality of web pages. The sequences of script operations performed by the scripts are tagged as malicious responsive to whether the sequences of script operations produce abnormal behaviors. Security data is generated based at least in part on the tagged sequences of script operations performed by the scripts where the security data describes sequences of malicious script operations. The security data is stored.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
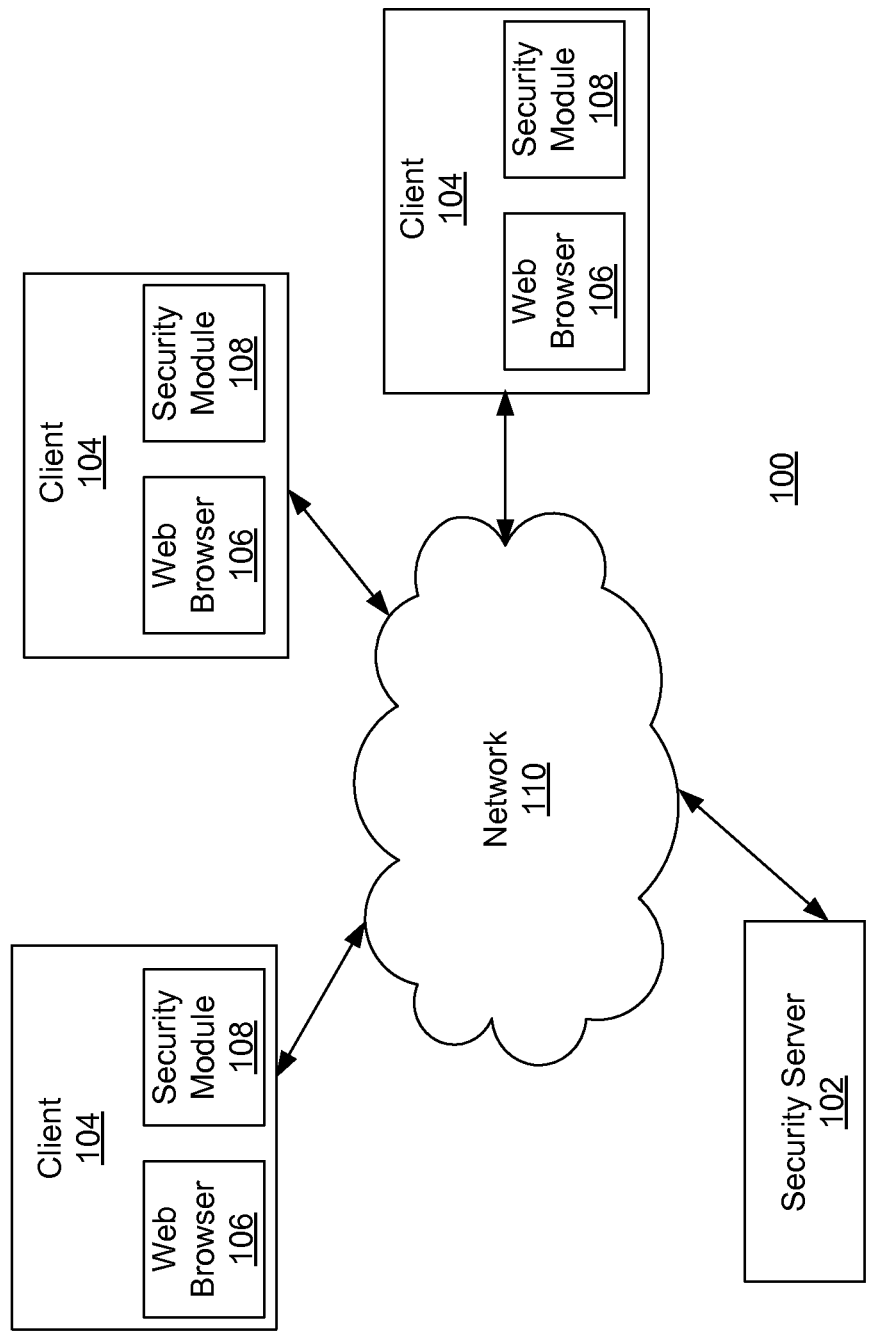
FIG. 1 is a high-level block diagram of a computing environment according to one embodiment.

FIG. 1 is a high-level block diagram of a computing environment 100 according to one embodiment. FIG. 1 illustrates a security server 102 and three clients 104 connected by a network 110. Only three clients 104 are shown in FIG. 1 in order to simplify and clarify the description. Embodiments of the computing environment 100 can have thousands or millions of clients 104 connected to the network 110.

Generally, the security server 102 generates security data that describe whether a sequence of script operations performed by a script object(s) on a web page, or whether script operations performed by a browser add-on or extension object (e.g., an ActiveX control or plug-in), will cause a browser security vulnerability. Note that for ease of understanding, the following description refers to script operations performed by a script object on a web page. However, one skilled in the art will recognize that the teachings herein can be applied to script operations performed by a browser add-on or extension object or any other object that can execute scripts on web pages.

In one embodiment, the security server 102 executes scripts (i.e., code) from a wide variety of websites. The scripts perform sequences of script operations to render pages from the websites. In one embodiment, the security server 102 generates a sequence of "script data values" that describe the script operations. In one embodiment, the script data values for a script indicate the scriptable objects, interfaces, methods and properties accessed by the script, as well as the argument types and arguments supplied during the accesses. The security server 102 classifies (i.e., records) the sequence of script data values as "malicious" or "non-malicious" based on whether the sequence of script data values caused abnormal browser behaviors. Thus, by classifying sequences of script data values, the security server 102 is indirectly tracking whether the script operations that generated the sequences are malicious or non-malicious. The security server 102 performs a statistical analysis on the script data values in order to identify sequences that are associated with malicious behavior. The security server 102 uses these malicious sequences to generate security data which are provided to the clients 104 and used to identify malicious scripts. One or more of the functions of the security server 102 can be provided by a cloud computing environment. As used herein, cloud computing refers to a style of computing in which dynamically scalable and often virtualized resources are provided as a service over the network 110.

In one embodiment, the security server 102 visits various web pages of websites on the network 110 and renders the pages using a web browser. While rendering a web page, the security server 102 logs (i.e., tracks) the sequences of script operations executed by a script on the page. In one embodiment, the security sever 102 tracks the sequences of script operations indirectly by tracking the script data values generated from the script operations. The security server 102 also determines whether executing the script operations results in abnormal browser behavior, such as crashing the browser, performing an illegal access of local resources, causing memory corruption, memory buffer overflows, or downloading of files that have not been requested or authorized by a user. These abnormal behaviors are presumed to result from malicious intent to exploit a security vulnerability, and scripts that cause these abnormal behaviors are deemed malicious.

The security server 102 tags sequences of script data values that result in abnormal behaviors as "malicious" and sequences that do not result in abnormal behaviors as "non-malicious." The security server 102 performs a statistical analysis on the malicious and non-malicious sequences of script data values in order to determine the likelihoods that given sequences are malicious. The security server 102 compiles the result of the statistical analysis into the security data that can be used to determine the likelihood that an observed sequence of script data values is malicious.

The security server 102 provides the security data to the clients 104 via the network 110. In one embodiment, a client 104 is a computer used by one or more users to perform activities including downloading, installing, and/or executing software applications. The client 104, for example, can be a personal computer comprising a web browser 106 such as MICROSOFT INTERNET EXPLORER, MOZILLA FIREFOX, APPLE SAFARI, and GOOGLE CHROME that allows the user to retrieve and display content from web servers and other computers on the network 110. In other embodiments, the client 104 is a network-capable device other than a computer, such as a personal digital assistant (PDA), a mobile telephone, a pager, a television "set-top box," etc. For purposes of this description, the term "client" also includes computers such as servers and gateways that encounter software applications or other entities that might constitute malware or other threats. For example, a client 150 can be a network gateway located between an enterprise network and the Internet.

The clients 104 include security modules 108 that use the security data to protect the clients. A security module 108 monitors web pages being loaded by the browser 106 on its associated client 104 and observes the sequences of script data values generated by script operations defined by scripts on the pages. By observing the script data values, the security module 108 indirectly observes the script operations since the script data values are a result of the execution of the script operations. The security module 108 analyzes the sequences using the security data to identify sequences of script data values generated by web pages that are likely to be malicious. Responsive to the security module 108 determining that a sequence is likely to be malicious, the security module performs a security action such as terminating the script or browser and notifying the user of the client 104 that a malicious script was detected.

The network 110 enables communications between the security sever 102 and the clients 104. In one embodiment, the network 110 uses standard communications technologies and/or protocols. Thus, the network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 110 can also include links to other networks such as the Internet.

Figure 2:
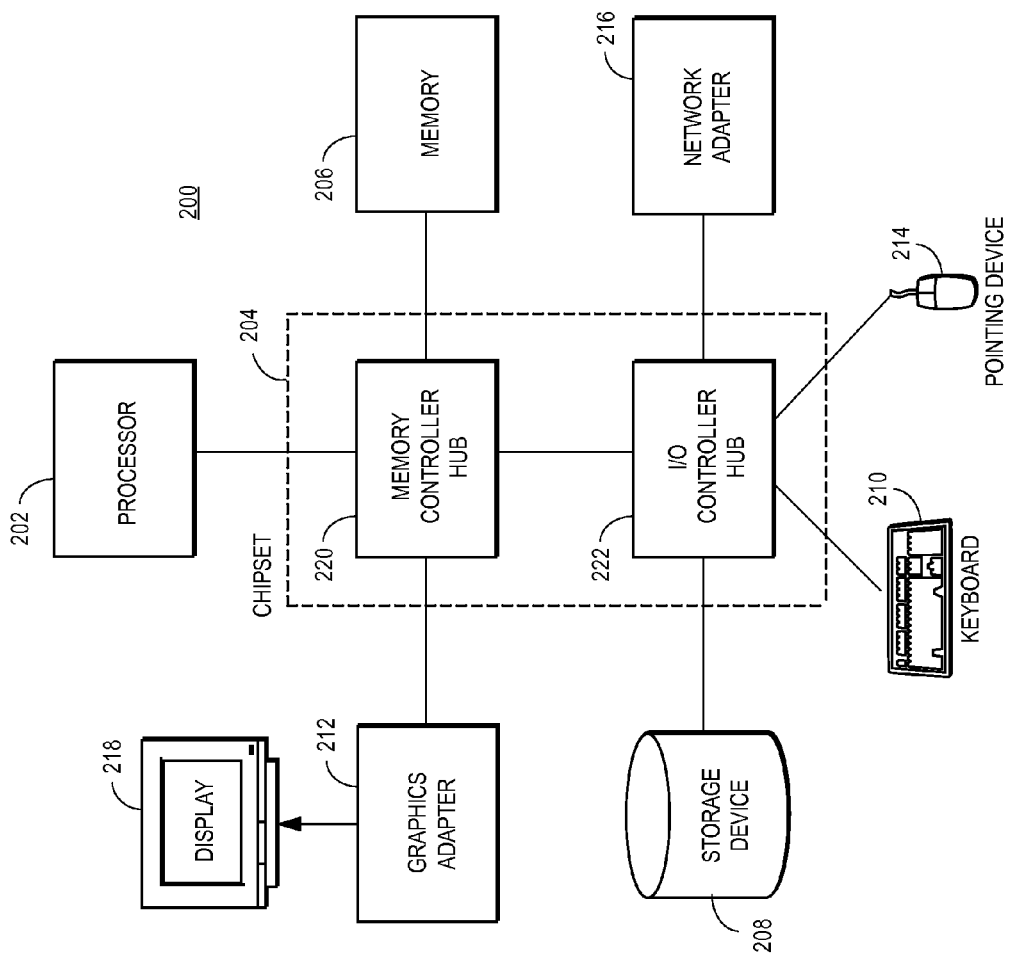
FIG. 2 is a high-level block diagram illustrating a typical computer for use as a security server or a client according to one embodiment.

FIG. 2 is a high-level block diagram of a computer 200 for acting as a security server 110 and/or a client 104 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a security server 110 lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
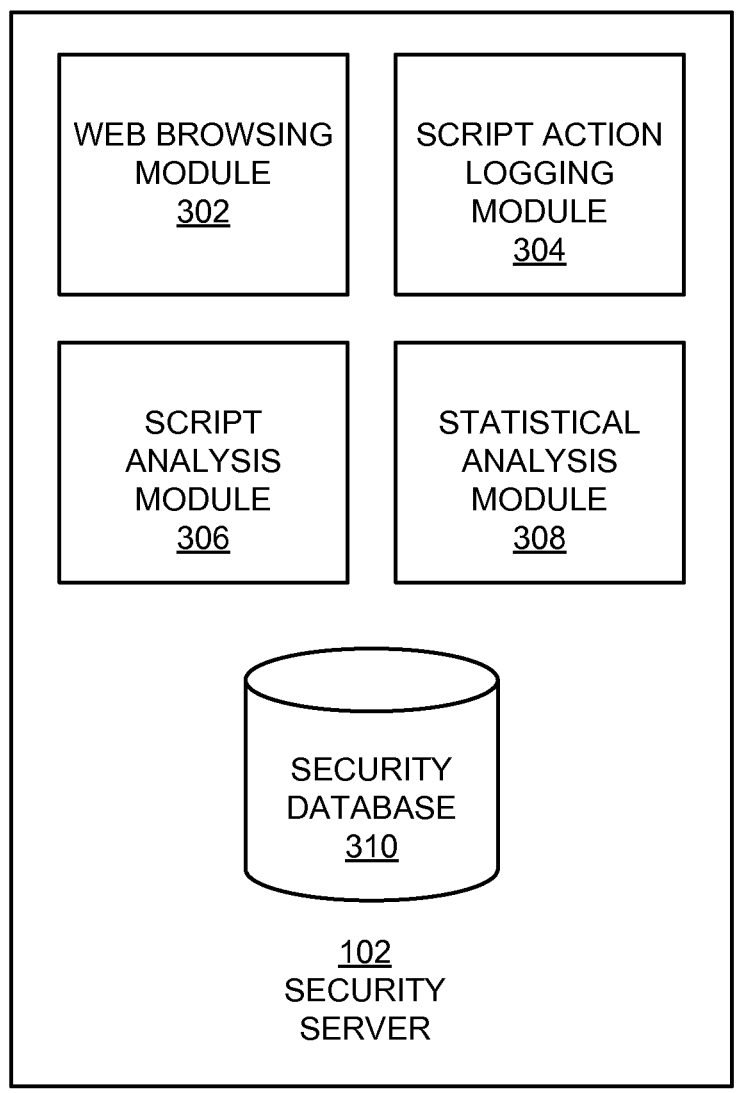
FIG. 3 is a high-level block diagram illustrating a detailed view of a security server according to one embodiment.

FIG. 3 is a high-level block diagram illustrating a detailed view of the security server 102 according to one embodiment. As shown in FIG. 3, the security server 102 includes multiple modules that are in communication with one another. Those of skill in the art will recognize that other embodiments of the security server 102 can have different and/or other modules than the ones described here, and that the functionalities can be distributed among the modules in a different manner.

The web browsing module 302 renders web pages from websites on the network 110. In one embodiment, the web browsing module 302 includes a web browser emulator that downloads, interprets, and executes scripts of web pages on the network 110. In some embodiments, the web browsing module 302 includes multiple instances of web browser emulators executing in parallel in order to simultaneously render web pages from many websites. The list of websites accessed by the web browsing module 302 is provided by a security analyst associated with the security server 102 and/or derived by crawling links of already-accessed websites. The websites can include popular sites that are known to be non-malicious as well as sites known to be malicious or likely to be malicious.

In one embodiment, the script action logging module 304 logs (i.e., tracks) script operations executed by the web browsing module 302 when rendering web pages. As a web page is being rendered by the web browsing module 302, the script action logging module 304 observes the sequence (i.e., stream) of script data values generated when the script of the web page executes. The script data values generally describe the sequence of script operations performed by the script. Thus, the script action logging module 304 indirectly monitors the script operations by tracking the script data values resulting from the operations. In one embodiment, each script data value in the stream identifies the associated scriptable object, an interface of that object, and a method called or property accessed by the script. In addition, the script data value describes the argument types and the argument values supplied to the method/property. For example, scriptable objects can be identified by class globally unique identifiers (GUID), the interfaces can be identified by interface GUIDs, and the methods and properties can be identified by dispatch identifiers (DISPIDs). The argument types are specified as string, numeric, etc., and the argument values are recorded directly. Thus, the script action logging module 304 produces sequences of data script values describing the behaviors of script operations on web pages when the pages are rendered.

In one embodiment, the script analysis module 306 analyzes the execution of script operations of a script on a web page to determine whether a script operation of the web page's script produces abnormal behavior in the web browser module 302. As mentioned above, abnormal behaviors can include crashing the browser, performing an illegal access of local resources, causing memory corruption, memory buffer overflows, or downloading of files that have not been requested or authorized by a user. The abnormal behaviors can also include execution of child processes or calls to the Application Programming Interface (API) which start or stop other processes on the system. Other embodiments can identify additional and/or different abnormal behaviors. If the script analysis module 306 observes the web browser module 302 performing an abnormal behavior during execution of a script operation, the sequence of script data values associated with the script that caused the abnormal behavior is tagged as "malicious." In one embodiment, only the sequence of script data values that resulted in the abnormal behavior is tagged as malicious. In other embodiments, additional script data values in addition to the sequence of script data values that resulted in the abnormal behavior are tagged as malicious. For example, the entire sequence of script data values of the web page including the script data values that lead to the abnormal behavior is tagged as malicious. The sequence is malicious because it represents an attempt to exploit vulnerability in the web browser or, at least, a possible vulnerability that might be exploited in the future. If the web page finishes (i.e., completes) rendering without causing any abnormal behaviors, the sequence(s) of script data values associated with the scripts on the page are tagged as "non-malicious."

In one embodiment, the statistical analysis module 308 analyzes the sequences of malicious and non-malicious script data values to identify sequences that are likely to be malicious. In one embodiment, the statistical analysis module 308 performs a statistical classification of the script data values into likely malicious and likely non-malicious sequences using a statistical algorithm such as C4.5 or C5.0. The statistical analysis module 308 uses the algorithm to identify sequences of script data values that are highly-likely to represent malicious behavior and, correspondingly, unlikely to represent non-malicious behavior.

In one embodiment, the statistical analysis module 308 generates security data that represent the result of the statistical analysis of the script data value sequences. The security data can be used to determine the likelihood that an observed sequence of script data values at a client 104 is likely to represent malicious or non-malicious behavior. In one embodiment, the security data are represented as a decision tree classifier having a plurality of branches. Branches of the decision tree describe sequences of script data values and indicate whether the sequences are likely to be malicious or non-malicious. The decision tree can indicate, for example, the likelihood that the sequence represented by a particular node in the tree is malicious. This likelihood can be specified as a percentage, e.g., the likelihood can indicate that the sequence represented by a given node was malicious in 70% of the observed instances of the sequence.

In one embodiment, the security database 310 stores the security data generated by the statistical analysis module 308. The security database 310 may also store the sequences of script data values and other associated information in some embodiments. The security server 102 provides the security data included in the security database 310 to clients 104 in order to initialize or update security software at the clients 104.

Figure 4:
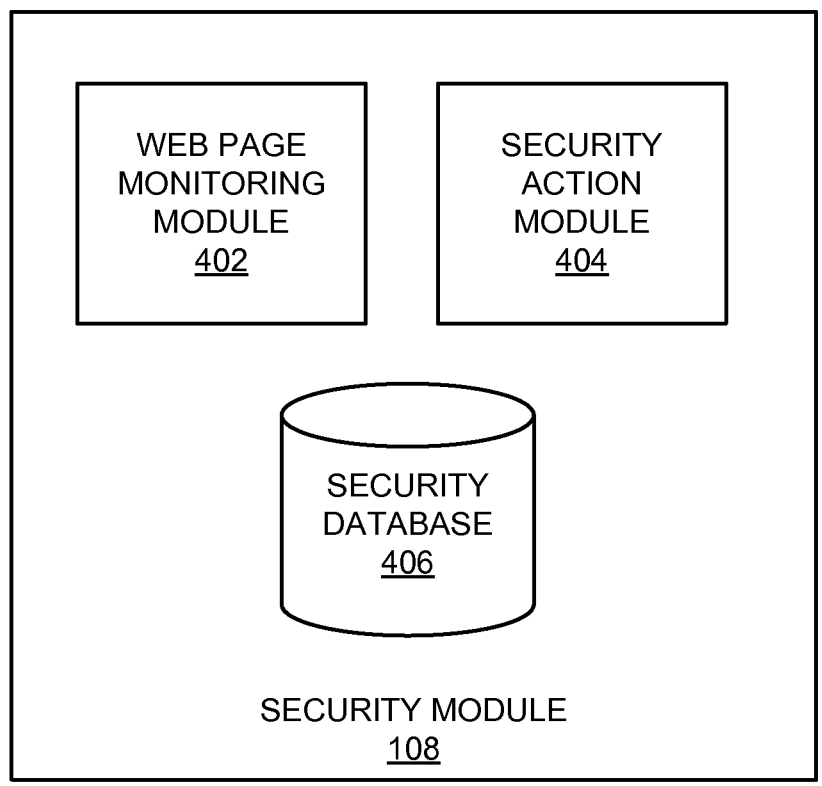
FIG. 4 is a high-level block diagram illustrating a detailed view of a security module of a client according to one embodiment.

FIG. 4 is a high-level block diagram illustrating a detailed view of the security module 108 of a client 104 according to one embodiment. As shown in FIG. 4, the security module 108 includes multiple modules that are in communication with one another. Those of skill in the art will recognize that other embodiments of the security module 108 can have different and/or other modules than the ones described here, and that the functionalities can be distributed among the modules in a different manner.

The security database 406 stores the security data provided by the security server 102. In one embodiment, the security data in the security database 406 are updated at regular intervals as scheduled by the security server 102 and/or client 104. In alternative embodiments, the security data in the security database 406 are updated upon request by the user of client 104.

In one embodiment, the web page monitoring module 402 monitors web pages loaded into the web browser 106 at the client 104. The web page monitoring module 402 analyzes the script operations of a web page as the web page is rendered by the web browser 106. Specifically, the web page monitoring module 402 monitors the same script data points observed by the script action logging module 304 of the security server 102, such that the web page monitoring module 402 generates a sequence of script data values for the web page as a result of the execution of the script operations specified by the web page's script.

The web page monitoring module 402 compares the sequence of script data values of the web page to the security data stored in the security database 406. In one embodiment, the web page monitoring module 302 uses the security data to determine whether a sequence of script data values produced while rendering a web page at the client 104 is likely to lead to an exploit of a security vulnerability at the client 104. That is, the web page monitoring module 302 uses the security data to determine whether the script operations of the web page at the client 104 is likely to lead to a security vulnerability at the client 104.

In the embodiment where the security data is represented by a decision tree classifier, the web page monitoring module 402 traverses nodes of the decision tree according to the monitored sequence of script data values until it reaches a node indicating either that the sequence is malicious or is not malicious. The web page monitoring module 402 can use thresholds to determine whether a sequence is malicious. For example, a threshold can specify that a sequence is classified as "non-malicious" if it has less than a 10% chance of resulting in an exploit of a security vulnerability. Similarly, a threshold can specify that a sequence is classified "malicious" if it has greater than an 80% chance of resulting in an exploit.

In one embodiment, the security action module 404 performs a security action to prevent an exploitation of security vulnerability on client 104. In one embodiment, the security action module 404 performs the security action based on whether the monitoring module 402 classifies a sequence of script data values from a web page as malicious or non-malicious. That is, the security action module 404 performs the security action if the sequence is classified as malicious. In another embodiment, the security action module 404 uses the classification produced by the web page monitoring module 402 as a heuristic that is combined with other heuristics to reach a determination as to whether a security action should be performed. For example, the security action module 404 can consider other factors, such as the reputation of the website that provided the web page, in combination with the classification produced by the monitoring module 402 to determine whether to perform a security action.

The security action module 404 can perform one or more of a variety of security actions. For example, the security action module 404 can terminate the script or scripts on the web page, restrict actions that the web browser 106 can perform, notify the user of the client 104 that an attempted exploit was detected, etc. If the security data indicate that the web page's sequence of script data values is non-malicious, the security action module 404 allows the web browser 106 to render the web page.

Figure 5:
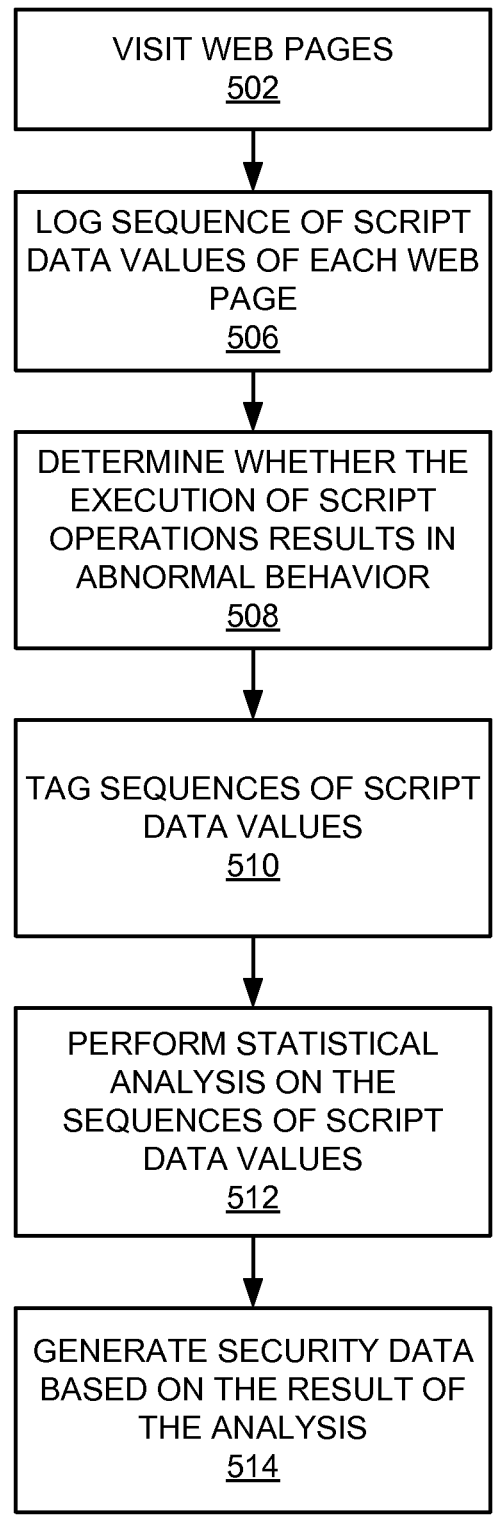
FIG. 5 is a flowchart illustrating steps performed by the security server to generate security data that describe whether a sequence of script operations performed by a script on a web page will exploit cause a browser security vulnerability according to one embodiment.

FIG. 5 is a flowchart illustrating steps performed by the security server 102 to generate security data that describe whether a sequence of script operations performed by a script on a web page will exploit cause a browser security vulnerability according to one embodiment. Other embodiments perform the illustrated steps in different orders, and/or perform different or additional steps. Moreover, some of the steps can be performed by modules or modules other than the security server 102.

In one embodiment, the security server 102 visits 502 various web pages of websites and renders the web pages. The security server logs 506 a sequence of script data values for each web page that is generated as a result of the script on the web page executing. For each web page, the security server 102 determines 508 whether the execution of the script operations on the web page produces abnormal behavior in the web browser. The security server 102 tags 510 the sequence of script data values associated with the script operations of each web page as either malicious or non-malicious responsive to whether the script operations produced abnormal behavior in the web browser. The security server 102 performs 512 a statistical analysis on the malicious and non-malicious sequences of script data values from the web pages to determine sequences of script data values that are likely to be malicious. The security server 102 generates 514 security data based on the result of the statistical analysis that are used at clients to prevent exploits of security vulnerabilities.

Figure 6:
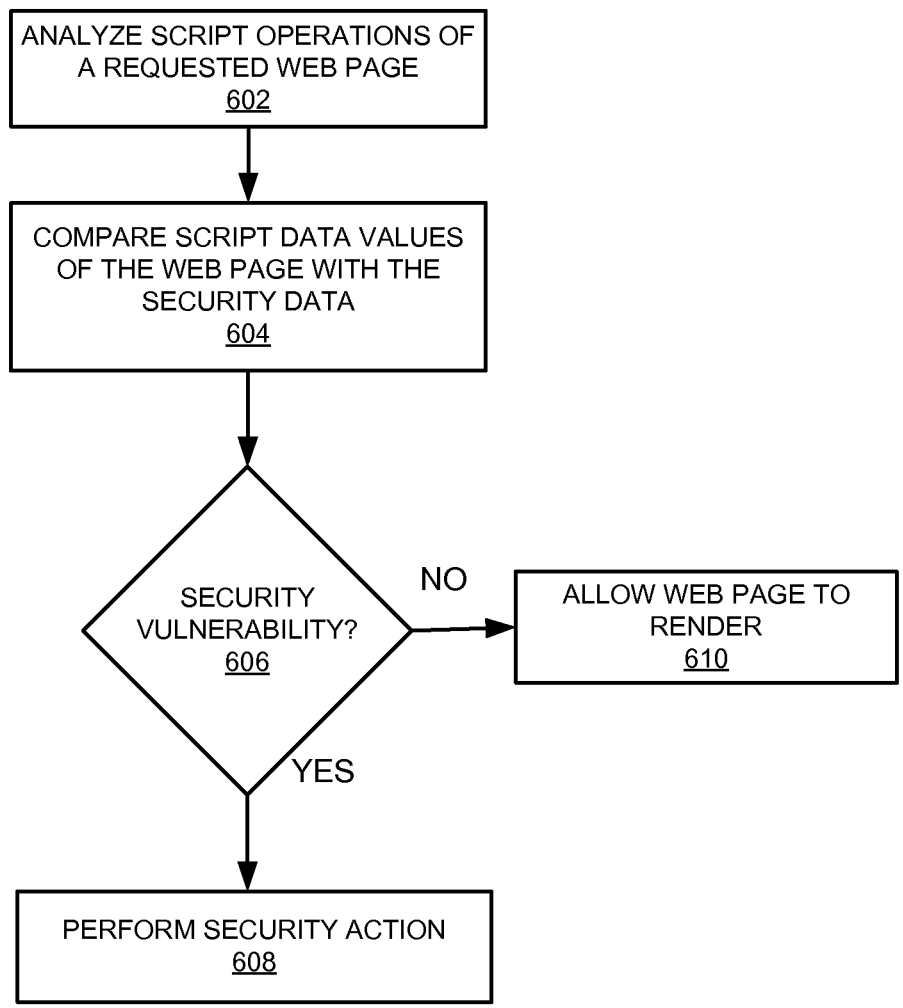
FIG. 6 is a flowchart illustrating one embodiment of how the security module prevents exploitation of a security vulnerability at a client.

FIG. 6 is a flowchart illustrating one embodiment of how the security module 108 prevents exploitation of a security vulnerability at a client 102. Other embodiments perform the illustrated steps in different orders, and/or perform different or additional steps. Moreover, some of the steps can be performed by modules other than the security module 108.

In one embodiment, the security module 108 analyzes 602 script operations performed by a script of a requested web page. The security module 108 compares 604 the sequence of script data values produced when executing the script operations of the web page with the security data. The security module 108 determines whether the security data indicate 606 that the script data values produced while rendering the web page are likely to attempt an exploit of a security vulnerability on the client 104. If the security data indicate that the web page's sequence of script data values is malicious, the security module 108 performs 608 a security action. Responsive to the security data indicating that the web page's script data values are non-malicious, the security module 108 allows 610 the web page to continue rendering at the client 104.

The above description is included to illustrate to a security server 102 and a security module 108 of a client 104 according to one embodiment. Other embodiments the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method performed by a server for generating security data describing sequences of operations performed by malicious scripts, comprising:
    rendering, by the server, a web page received from a website, the web page having an associated script that executes a sequence of script operations responsive to the rendering;
    monitoring, by the server, a sequence of script data values that are generated as a result of the execution of the sequence of script operations performed by the script;
    determining, by the server, that a subset of the sequence of script data values produces an abnormal behavior on the server and that another subset of the sequence of script data values does not produce any abnormal behavior on the server;
    tagging, by the server, the subset of the sequence of script data values as malicious responsive to the subset of the sequence of script data values producing the abnormal behavior;
    tagging, by the server, the other subset of the sequence of script data values as non-malicious responsive to the other subset of the sequence of script data values not producing any abnormal behavior;
    performing, by the server, a statistical analysis of sequences of script data values tagged as malicious that include the tagged subset of the sequence of script data values and sequences of script data values tagged as non-malicious that include the other subset of the sequence of script data values to determine a likelihood that the subset of the sequence of script data values is malicious;
    generating, by the server, security data based on the statistical analysis, the security data adapted to determine a likelihood of whether an observed sequence of script data values at a client is malicious; and
    storing the security data at the server.

2. The computer-implemented method of claim 1, wherein a script data value in the sequence of script data values describes an identifier of a scriptable object accessed by the script, a method called or property of the scriptable object accessed by the script, an argument type provided to the method or property and an associated argument value.

3. The computer-implemented method of claim 1, wherein determining, by the server, that the subset of the sequence of script data values produces the abnormal behavior comprises:
    rendering, in a web browser on the server, the web page having the associated script, the rendering comprising executing the sequence of script operations specified by the script; and
    detecting, by the server, whether the web browser performs the abnormal behavior responsive to performing a subset of the sequence of script operations specified by the script, the subset of the sequence of script operations generating the subset of the sequence of script data values that produced the abnormal behavior.

4. The computer-implemented method of claim 3, wherein the abnormal behavior comprises at least one selected from the group consisting of: a crash of the web browser, a corruption of memory of the browser, an overflow of a memory buffer of the web browser, an illegal access of local resource by the web browser, an unauthorized downloading of a file by the web browser, an execution of a child process by the web browser, and a call to an application programming interface that starts or stops a process.

5. The computer-implemented method of claim 1, wherein the security data describe a decision tree classifier comprising a plurality of branches describing sequences of script data values and indications of whether the sequences of script data values described by the branches are malicious.

6. The computer-implemented method of claim 1, further comprising:
    providing the security data to at least one client coupled to the server.

7. A computer system for generating security data describing sequences of operations performed by malicious scripts, the system comprising:
    a computer processor; and
    a non-transitory computer-readable storage medium storing computer code, the code when executed by the computer processor performing steps comprising:
        rendering, by the computer system, a web page received from a website, the web page having an associated script that executes a sequence of script operations responsive to the rendering;
        monitoring, by the computer system, a sequence of script data values that are generated as a result of the execution of the sequence of script operations performed by the script;
        determining, by the computer system, that a subset of the sequence of script data values produces an abnormal behavior on the computer system and that another subset of the sequence of script data values does not produce any abnormal behavior on the server;
        tagging, by the computer system, the subset of the sequence of script data values as malicious responsive to the subset of the sequence of script data values producing the abnormal behavior;
        tagging, by the computer system, the other subset of the sequence of script data values as non-malicious responsive to the other subset of the sequence of script data values not producing any abnormal behavior;
        performing, by the computer system, a statistical analysis of sequences of script data values tagged as malicious that include the tagged subset of the sequence of script data values and sequences of script data values tagged as non-malicious that include the other subset of the sequence of script data values to determine a likelihood that the subset of the sequence of script data values is malicious;
        generating, by the computer system, security data based on the statistical analysis, the security data adapted to determine a likelihood of whether an observed sequence of script data values at a client is malicious; and
        storing the security data at the computer system.

8. The computer system of claim 7, wherein a script data value in the sequence of script data values describes an identifier of a scriptable object accessed by the script, a method called or property of the scriptable object accessed by the script, an argument type provided to the method or the property and an associated argument value.

9. The computer system of claim 7, wherein the non-transitory computer-readable storage medium further comprises computer code that when executed by the computer processor performs the steps comprising:
   rendering, in a web browser on the computer system, the web page having the associated script, the rendering comprising executing the sequence of script operations specified by the script; and
   detecting, by the computer system, whether the web browser performs an abnormal behavior responsive to performing a subset of the sequence of script operations specified by the script, the subset of the sequence of script operations generating the subset of the sequence of script data values that produced the abnormal behavior.

10. The computer system of claim 7, wherein the security data describe a decision tree classifier comprising a plurality of branches describing sequences of script data values and indications of whether the sequences of script data values described by the branches are malicious.

11. The computer system of claim 7, wherein the code when executed by the computer processor performs further steps comprising:
   providing the security data to at least one client coupled to the computer system.

12. A non-transitory computer-readable storage medium storing executable code for generating, by a server, security data describing sequences of operations performed by malicious scripts, the code when executed performing steps comprising:
   rendering, by the server, a web page received from a website, the web page having an associated script that executes a sequence of script operations responsive to the rendering;
   monitoring, by the server, a sequence of script data values that are generated as a result of the execution of the sequence of script operations performed by the script;
   determining, by the server, that a subset of the sequence of script data values produces an abnormal behavior on the server and that another subset of the sequence of script data values does not produce any abnormal behavior on the server;
   tagging, by the server, the subset of the sequence of script data values as malicious responsive to the subset of the sequence of script data values producing the abnormal behavior;
   tagging, by the server, the other subset of the sequence of script data values as non-malicious responsive to the other subset of the sequence of script data values not producing any abnormal behavior;
   performing, by the server, a statistical analysis of sequences of script data values tagged as malicious that include the tagged subset of the sequence of script data values and sequences of script data values tagged as non-malicious that include the other subset of the sequence of script data values to determine a likelihood that the subset of the sequence of script data values is malicious;
   generating, by the server, security data based on the statistical analysis, the security data adapted to determine a likelihood of whether an observed sequence of script data values at a client is malicious; and
   storing the security data at the server.

13. The non-transitory computer-readable storage medium of claim 12, wherein a script data value in the sequence of script data values describes an identifier of a scriptable object accessed by the script, a method called or property of the scriptable object accessed by the script, an argument type provided to the method or property and an associated argument value.

14. The non-transitory computer-readable storage medium of claim 12, wherein determining, by the server, that the subset of the sequence of script data values produces the abnormal behavior comprises:
   rendering, in a web browser on the server, the web page having the associated script, the rendering comprising executing the sequence of script operations specified by the script; and
   detecting, by the server, whether the web browser performs the abnormal behavior responsive to performing a subset of the sequence of script operations specified by the script, the subset of the sequence of script operations generating the subset of the sequence of script data values that produced the abnormal behavior.

15. The non-transitory computer-readable storage medium of claim 14, wherein the abnormal behavior comprises at least one selected from the group consisting of: a crash of the web browser, a corruption of memory of the browser, an overflow of a memory buffer of the web browser, an illegal access of local resource by the web browser, an unauthorized downloading of a file by the web browser, an execution of a child process by the web browser, and a call to an application programming interface that starts or stops a process.

16. The non-transitory computer-readable storage medium of claim 12, wherein the security data describe a decision tree classifier comprising a plurality of branches describing sequences of script data values and indications of whether the sequences of script data values described by the branches are malicious.

* * * * *